United States Patent [19]
Liden

[11] 3,858,109

[45] Dec. 31, 1974

[54] BRUSHLESS TACHOMETER

[75] Inventor: Sam P. Liden, Phoenix, Ariz.

[73] Assignee: Sperry Rand Corporation, New York, N.Y.

[22] Filed: Mar. 23, 1973

[21] Appl. No.: 344,397

[52] U.S. Cl. ............... 322/31, 318/327, 318/328, 324/160, 324/163
[51] Int. Cl. ............................................. H02p 9/00
[58] Field of Search ........ 317/5; 318/326, 327, 328; 324/160, 163, 164, 166; 322/31

[56] References Cited
UNITED STATES PATENTS

| | | | |
|---|---|---|---|
| 3,348,559 | 10/1967 | Brothman et al. | 322/31 X |
| 3,384,816 | 5/1968 | Romberg | 324/166 |
| 3,480,207 | 11/1969 | Strohmaier | 324/163 X |
| 3,508,137 | 4/1970 | Hill | 324/163 X |
| 3,594,555 | 7/1971 | Klein | 324/166 |
| 3,619,762 | 11/1971 | Pitchard | 322/31 |
| 3,662,252 | 5/1972 | Smith | 322/31 X |

Primary Examiner—William M. Shoop, Jr.
Attorney, Agent, or Firm—Howard P. Terry

[57] ABSTRACT

An alternating current variable permeance resolver is mechanically coupled to rotate in synchronism with a direct current brushless generator the rotor of which is rotated at a speed desired to be measured. The generator produces two alternating current voltages proportional, respectively, to the speed of rotation and to the sine and cosine of the instantaneous generator rotor position. These two ac voltages are modulated by an ac voltage the frequency of which is very high relative to the maximum design generator/resolver rotation speed and applied to the quadrature windings of the resolver which are therefore input windings. The voltage at the output winding of the resolver is therefore proportional to the speed components of the generator signal, the sine/cosine components cancelling. The resolver output signal is then demodulated at the same modulation frequency whereby to provide a dc output signal proportional to the rate of rotation of the generator rotor.

5 Claims, 3 Drawing Figures

BRUSHLESS TACHOMETER

BACKGROUND OF THE INVENTION

Field of the Invention

This invention relates generally to tachometer generators for providing an output proportional to the rate of rotation of a mechanical part, such as a rotating shaft or more specifically, for example, the rate of rotation of the gimbal of a gyroscopic device. More particularly, the present invention relates to brushless tachometers.

Description of the Prior Art

Over the past several years there has been an increasing desire to eliminate brushes on electric rotating machinery such as motors, generators, resolvers and the like whereby to eliminate the sparking, friction, wear and wear debris inherent in brush devices. One important application for brushless devices is in electrical machinery used in space. For example, a specific space application for brushless devices is in gyroscopic stabilization apparatus for spacecraft wherein gyroscopic inertia is precisely controlled to apply direct stabilizing forces to maintain it in a precise attitude, i.e. control moment gyroscopes. In such devices, extremely precise closed loop servo systems are employed to maintain spacecraft attitude accuracy within fractions of an arc second. Such servo loops require extremely precise, or high resolution, high gain gimbal rate information and it is the primary object of the present invention to provide such rate information by means of a brushless tachometer. It will be understood, however, that the improved tachometer of the present invention is applicable not only in space hardware but in any landborne or airborne hardware where the inherent characteristics thereof are required or desired.

Brushless tachometers have been proposed in the past but to Applicant's knowledge these devices have employed Hall effect devices. One example is the Hall effect tachometer disclosed in Applicant's assignee's copending patent application Ser. No. 244,061 filed Apr. 14, 1972 in the name of R. C. Ellis and entitled "Rotational Transducer Using Hall Effect Devices." While such devices have proved useful in many applications, they have certain inherent disadvantages which are overcome by the present invention. For example, tachometers using Hall effect devices have a low signal level, especially at very low rotation rates due to the inherent low power capability of the Hall effect elements. Another disadvantage is that such elements are susceptible to noise and stray magnetic fields and are very temperature sensitive, that is their electrical characteristics vary sharply with variations in temperature.

SUMMARY OF THE INVENTION

The brushless tachometer of the present invention overcomes the foregoing disadvantage of brush-type tachometers and brushless tachometers employing Hall effect devices. In addition to the primary advantage of being brushless, the present tachometer has a higher output signal level which is extremely important in applications requiring a measure of very low rates of rotation. Additionally, it is less sensitive to temperature variations and stray magnetic fields.

In general, the brushless tachometer of the present invention comprises a generator having a multi-pole, permanent magnet rotor and a two-phase wound stator, the rotor being driven by the mechanical part of the rate of rotation of which is to be measured. Also driven by the same mechanical part is a brushless resolver means having a two-phase stator means responsive to the outputs of the corresponding phase windings of the generator, a single phase output means and a multicycle rotor means related to the number of poles of the generator rotor for coupling the signals of said two-phase stator means into said output means in accordance with the instantaneous rotational position of the rotor, the resultant output of the stator output means being proportional to the rate of rotation of said mechanical part. In one preferred embodiment, the brushless resolver means comprises a conventional variable permeance type resolver operated in reverse, that is, wherein its normal sine/cosine output windings constitute the input windings and its normal single phase input windings constitute the output or summing winding in its present application.

DESCRIPTION OF THE PREFERRED EMBODIMENT

The brushless tachometer of the present invention is particularly applicable in high precision, high response closed loop servo systems wherein high quality rate information is required for rate control or for damping purposes in a position control system, and particularly wherein very low rates are to be accurately measured. One such application is in control moment gyroscopes for precisely stabilizing space vehicles with fractions of arc second accuracy. In this application, gimbal rates must be measured with great precision so that the control moment gyro/vehicle position servo loop may be very tightly controlled.

Figure 1:
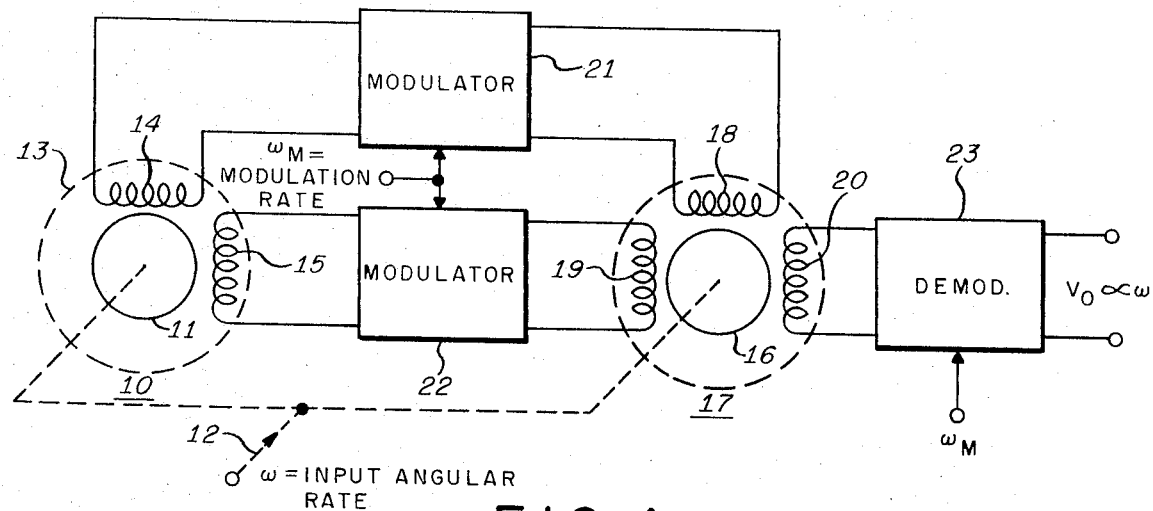
FIG. 1 is a schematic illustration of the brushless tachometer of the present invention and FIG. 2 is a block diagram of the apparatus of FIG. 1 illustrating the signal transfer characteristics of the various elements thereof.

Referring now to FIG. 1, a preferred embodiment of the brushless tachometer of the present invention comprises a brushless generator 10 having a permanent magnet rotor 11 driven by the gyro gimbal 12 at a rate $\omega$ and a two phase stator 13 fixed to the vehicle consisting of quadrature windings 14 and 15. The stator winding 14 may be considered the sine winding and the winding 15 the cosine winding. The permanent magnet rotor 11 include a plurality P of discrete poles. In one embodiment a forty pole generator was successfully used. Also driven by gimbal 12 is the rotor 16 of a conventional brushless variable permeance resolver 17 having two phase or quadrature windings 18 and 19 and single phase winding 20. In accordance with the teachings of the present invention, the resolver 17 is employed in inversely of its conventional or normal usage; that is, the normal excitation winding is used as the output winding 20 while the normal sine/cosine output windings are used herein as the input windings, 18 and 19 respectively. The rotor 16 comprises a plurality of variable permeance elements (not shown) similar to cogs of a gear distributed about the circumference of the rotor surface for coupling, by transformer action, the signals in input windings 18 and 19 into the output winding 20. However, it should be noted that, in the present embodiment, the number of resolver cycles must correspond to the number of pole pairs, i.e., P/2 of the generator rotor 11.

The sine winding 14 of generator 10 is connected to the sine winding 18 of resolver 17 through a modulator 21 while the cosine winding 15 of generator 10 is connected to the cosine winding 19 of resolver 17 through another modulator 22. The modulation frequency $\omega_M$ is preferably very high, for example greater by at least an order of magnitude then the maximum expected rate of rotation of the gimbal 12. A modulation frequency of 4000 Hz has been used with success. The modulators 21 and 22 therefore increase the frequency characteristics of the generator sine/cosine signals so that they may be accurately transformed through reluctance resolver 17. In general, but of course within limits, the higher the frequency the better the transformation characteristics through the resolver.

It should also be understood that in some applications it may not be convenient to drive the resolver rotor 16 in a one-to-one ratio with the generator rotor 11. In this case the number of variable permeance elements of the resolver rotor 16 (or the number of poles of generator rotor 11) may be varied in accordance with the gear ratio between the generator and resolver rotors so as to produce the required one-to-one ratio between the resolver cycles versus the generator poles.

The output of resolver winding 20 is applied to a demodulator 23 which is synchronized with modulators 21 and 22 to provide the desired dc output signal proportional to the gimbal rate $\omega$.

Figure 2:
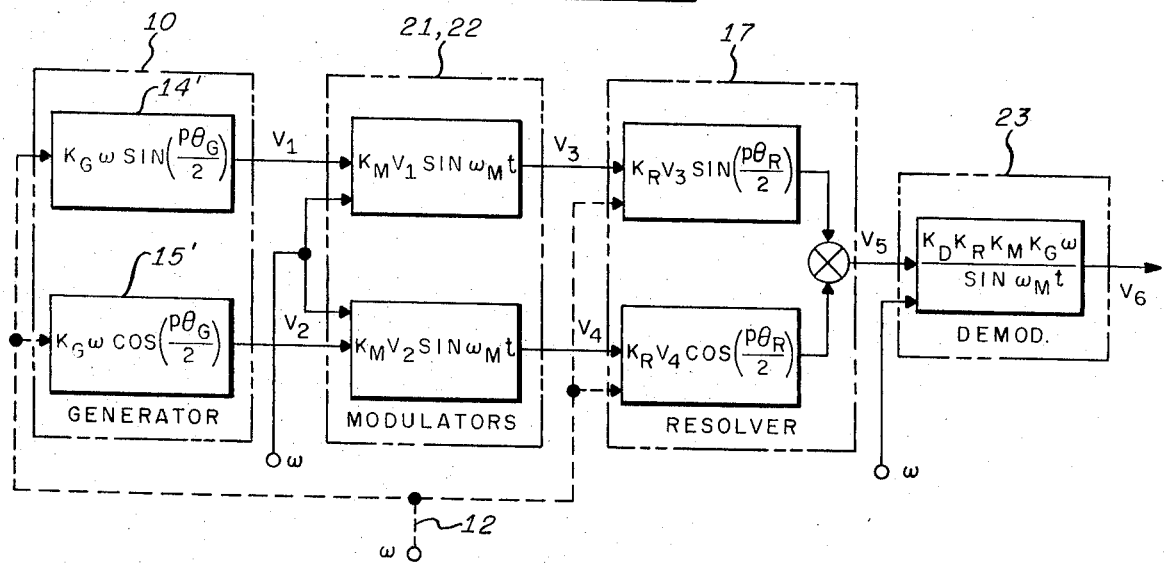

The mathematical basis for the brushless tachometer of the present invention will now be described, reference being made to FIG. 2.

The voltage generated in the sine/cosine windings 14 and 15 are represented by the transfer function illustrated in blocks 14′ and 15′ and their outputs represented by $V_1$ and $V_2$ both respectively. Thus $$V_1 = K_G \omega \sin(P \theta_G/2 /) \quad (1)$$

and $$V_2 = K_G \omega \cos(P \theta_G/2) \quad (2)$$

where
- $K_G$ = sensitivity or gain parameter of the generator in units or volts/(radian/sec)
- $\omega$ = angular velocity of rotor 11 (gimbal rate) in units of radians/sec
- P = number of poles
- $\theta_G$ = the instantaneous angular position of the rotor in radians The signals represented by $V_1$ and $V_2$ are applied to modulators 21 and 22 where they are modulated at the relatively high modulation frequency $\omega_M$ to produce output signals $V_3$ and $V_4$ illustrated by the transfer functions of blocks 21′ and 22′ both respectively. Thus $$V_3 = K_M V_1 \sin \omega_M t \quad (3)$$

and $$V_4 = K_M V_2 \sin \omega_M t \quad (4)$$

where
- $K_M$ = modulator voltage gain
- $\omega_M$ = modulation frequency in radians/sec.

The output signals $V_3$ and $V_4$ are applied to the sine and cosine windings 18 and 19 of resolver 17, the rotor 16 of which is positioned in synchronism with rotor 11 of generator 10. Since the number of resolver cycles per revolution is, in the present embodiment, the same as the number of poles pairs of the generator (P/2) rotor, the resolver output voltage $V_5$ is the sum of the sine, cosine transfer functions illustrated in blocks 18′, 19′.

Thus, $$V_5 = K_R [V_3 \sin (P \theta_R/2) + V_4 \cos (P \theta_R/2)] \quad (5)$$

where
- $K_R$ = resolver gain (i.e. transformation ratio)
- $\theta_R$ = instantaneous angular position of the resolver rotor in radians.

Since, as stated above, the generator rotor 11 and resolver rotor 16 are driven in synchronism and, in the present embodiment, in a one-to-one ratio and are mechanically indexed so that $\theta_G = \theta_R$, all of the equations (1) through (5) may be combined and equation (5) may be rewritten as follows:

$$V_5 = K_R K_M K_G \omega [\sin^2 (P \theta_G/2) + \cos^2 (P \theta_G/2)] \sin(\omega_M t) \quad (6)$$

which reduces to $$V_5 = K_R K_M K_G \omega \sin(\omega_M t) \quad (7)$$

The output of winding 20 of resolver 17 represented by $V_5$ is applied to demodulator 23 that is operated synchronously with modulators 21, 22 to preserve proper polarity, whereby the final output signal $V_6$ is the required dc signal proportional to the angular velocity $\omega$ of the gimbal 12.

Thus, $$V_6 = K_D K_R K_M K_G \omega$$

where
- $K_D$ is the voltage gain of the demodulator 23.

Figure 3:
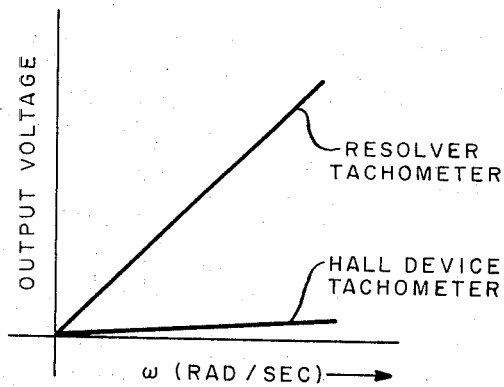
FIG. 3 is a graph showing the output characteristic of the resolver tachometer of the present invention as compared with a Hall effect type tachometer.

Thus, the output signal $V_6$ is directly proportional to shaft 12 velocity and is dependent only on fixed determinable gain characteristics. Since all of these gain characteristics are inherently high, the signal level of the final output signal $V_6$ is correspondingly inherently high as represented graphically in FIG. 3 in comparison with the inherently low signal characteristic of a brushless tachometer employing Hall effect devices.

While the invention has been described in a preferred embodiment, it will be understood that other embodiments of the concept will occur to those skilled in this art. For example, other forms of brushless resolver devices may be used such as photometric resolvers wherein the resolver stator means includes a pair of light sources, such as light emitting diodes have their intensities modulated in accordance with $V_1$ and $V_2$ and a pair of photo detectors, responsive to the LED outputs are varied by a rotor means including shutters positioned by shaft 12 having transmissive characteristics proportional to the sine and cosine function of shaft 12 rotation, the outputs being suitable summed (or purely optical summation may be employed. Also, a capacitive resolver which may be similar to that shown in Applicant's assignee's U.S. Pat. No. 3,147,374 may be employed. The use of other resolving devices may be apparent to those skilled in this art.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A brushless tachometer for providing a signal proportional to the rate of rotation of a machine element, the combination comprising
    a brushless generator including a permanent magnet rotor rotated by said element and a two-phase stator responsive to said stator rotation for producing a pair of output signals proportional to the speed of rotation of said element and to the sine and cosine of the instantaneous angular position of said element,
    a brushless resolver means including a rotor also rotated by said element, and stator means,
    said stator means comprising a pair of input means responsive respectively to the output signals of said generator stator, and output means responsive to said input means and to the sine and cosine of the instantaneous angular position of said resolver rotor corresponding to the instantaneous angular position of said generator rotor, for cancelling the sine and cosine components of said generator signals, whereby the output signal of said resolver output means is proportional to the speed of rotation of said machine element.

2. The brushless tachometer as set forth in claim 1 wherein said generator rotor comprises a multipole permanent magnet rotor and said resolver rotor includes means for producing a plurality of resolver cycles proportional to the number of poles of said generator rotor.

3. The brushless tachometer as set forth in claim 1 wherein said resolver means comprises a variable permeance resolver having two-phase input windings responsive respectively to said generator windings and a single phase output winding and wherein said resolver rotor couples said input winding signals to said output winding in accordance with the instantaneous angular position of said rotor.

4. The brushless tachometer as set forth in claim 3 further including
    modulator means responsive to said generator output signals for modulating said signals at a frequency very much higher than the maximum speed of rotation of said machine element to be measured.

5. The brushless tachometer as set forth in claim 4 further including
    demodulator means responsive to the output of said resolver output winding for demodulating said output signal synchronously with said modulation frequency.

* * * * *